United States Patent

Rhee

[15] 3,700,803

[45] Oct. 24, 1972

[54] SELF-TRACKING NOISE SUPPRESSING CIRCUIT

[72] Inventor: Dong Woo Rhee, Williamsville, N.Y.

[73] Assignee: GTE Sylvania Incorporated

[22] Filed: March 15, 1971

[21] Appl. No.: 124,341

[52] U.S. Cl...........178/7.3 R, 178/DIG. 12, 325/473
[51] Int. Cl...............................................H04n 5/44
[58] Field of Search....178/7.3 R, 7.3 S, 7.5 R, 7.5 S, 178/DIG. 12; 325/473, 478

[56] References Cited

UNITED STATES PATENTS 3,437,751 4/1969 Hansen...............178/DIG. 12
3,535,444 10/1970 Anderson et al........178/7.3 R

*Primary Examiner*—Richard Murray
*Attorney*—Norman J. O'Malley, Robert E. Walrath and Thomas H. Buffton

[57] ABSTRACT

Video signals which may include noise signals are applied via peak signal detecting and signal averaging circuitry to an electron device to effect signal clamping at a given level which varies in accordance with variations in magnitude of the applied video signal and wherein noise signals above the given clamping level are fed back in inverse polarity relationship to cause cancellation of the noise signals in the applied video signal.

12 Claims, 2 Drawing Figures

PATENTED OCT 24 1972 3,700,803

INVENTOR.
DONG WOO RHEE
BY
Robert E. Walrath
ATTORNEY

SELF-TRACKING NOISE SUPPRESSING CIRCUIT

BACKGROUND OF THE INVENTION

It is well known that synchronizing pulse separation and automatic gain control (AGC) circuitry of a television receiver are dependent upon the synchronizing pulse signals included in the composite video signals received at an antenna. There composite video signals not only vary in magnitude for many reasons but also frequently include undesired random noise pulses. Thus, operation of the sync pulse separation and AGC circuitry is often undesirably altered by variations in magnitude of the sync pulse signals and by the inclusion of undesired random noise pulse signals.

A well known technique for reducing the effects of random noise pulse signals is to provide a noise gate transistor in series with a sync pulse separation stage. The noise gate transistor is biased for saturation conduction for signals which do not exceed the magnitude of the sync pulse signals. However, random noise pulse signals which do exceed the magnitude of the sync pulse signals cause a cut-off or non-conduction of the noise gate transistor and, in turn, prevent conduction of the sync separator stage.

Also, known sync pulse separation and AGC circuitry are frequently interconnected in a manner such that alterations in bias potential of the AGC system cause alterations in sync pulse signal magnitude without altering the bias potential applied to the sync pulse separation stage. As a result, the sync pulse separation stage does not clamp the tips of the sync pulse signals in a proper manner and the sync pulse signals are undesirably affected by AGC bias potential alterations, as well as random noise pulse signals which are of a magnitude greater than the sync pulse signals.

Further, noise gate transistor systems include sync pulse separation stages which are reasonably unaffected by random noise pulse signals which exceed the magnitude of an applied sync pulse signal. However, the noise gate transistor has little or no effect on random noise pulse signals which do not exceed the magnitude of the applied sync pulse signal whereupon the sync pulse separation stage is undesirably affected by smaller or clipped random noise signals. Thus, the sync pulse separation stage of interconnected sync pulse separation and AGC stages is undesirably affected by necessary AGC alterations and by random noise pulse signals which are either of a magnitude greater than or less than the magnitude of the sync pulse tips.

One known circuit for improving the above-mentioned undesired conditions is disclosed in a U.S. Patent entitled "Transistorized Control Circuitry for Television Receiver" filed Dec. 13, 1967 in the name of Joseph Edward Thomas and bearing U.S. Pat. No. 3,548,097. Therein, a device having a maximum impedance to relatively high frequency signals is included in the sync pulse separation circuitry. The device, preferably a choke, tends to pass the relatively low frequency signals while attenuating relatively high frequency signals such as random noise pulse signals.

Although such systems have been widely employed and provided greatly improved results over prior known techniques, it has been found that there are conditions whereupon such circuitry does leave something to be desired. For example, it has been found that the above-mentioned circuitry tends to be dependent upon the magnitude of the AGC potentials which normally require something in the neighborhood of about 20 microvolts for satisfactory operation. Thus, noise immunity would be undesirably deficient below the above-mentioned 20 microvolt level.

OBJECTS AND SUMMARY OF THE INVENTION

Accordingly, it is an object of the present invention to provide improved noise suppression circuitry. Another object of the invention is to provide enhanced circuitry for tracking variations in magnitude of an applied signal. Still another object of the invention is to provide enhanced self-tracking noise suppression circuitry. A further object of the invention is to provide improved self-tracking noise suppression circuitry responsive to relatively low level signals.

These and other and further objects, advantages and capabilities are achieved in one aspect of the invention by self-tracking noise suppressing circuitry wherein an electron device coupled to first and second amplifier stages is also coupled by a peak detecting and signal averaging circuit to the first and second amplifier stages and by a feedback circuit means to a video signal source.

PREFERRED EMBODIMENT OF THE INVENTION

Figures 1, 2:
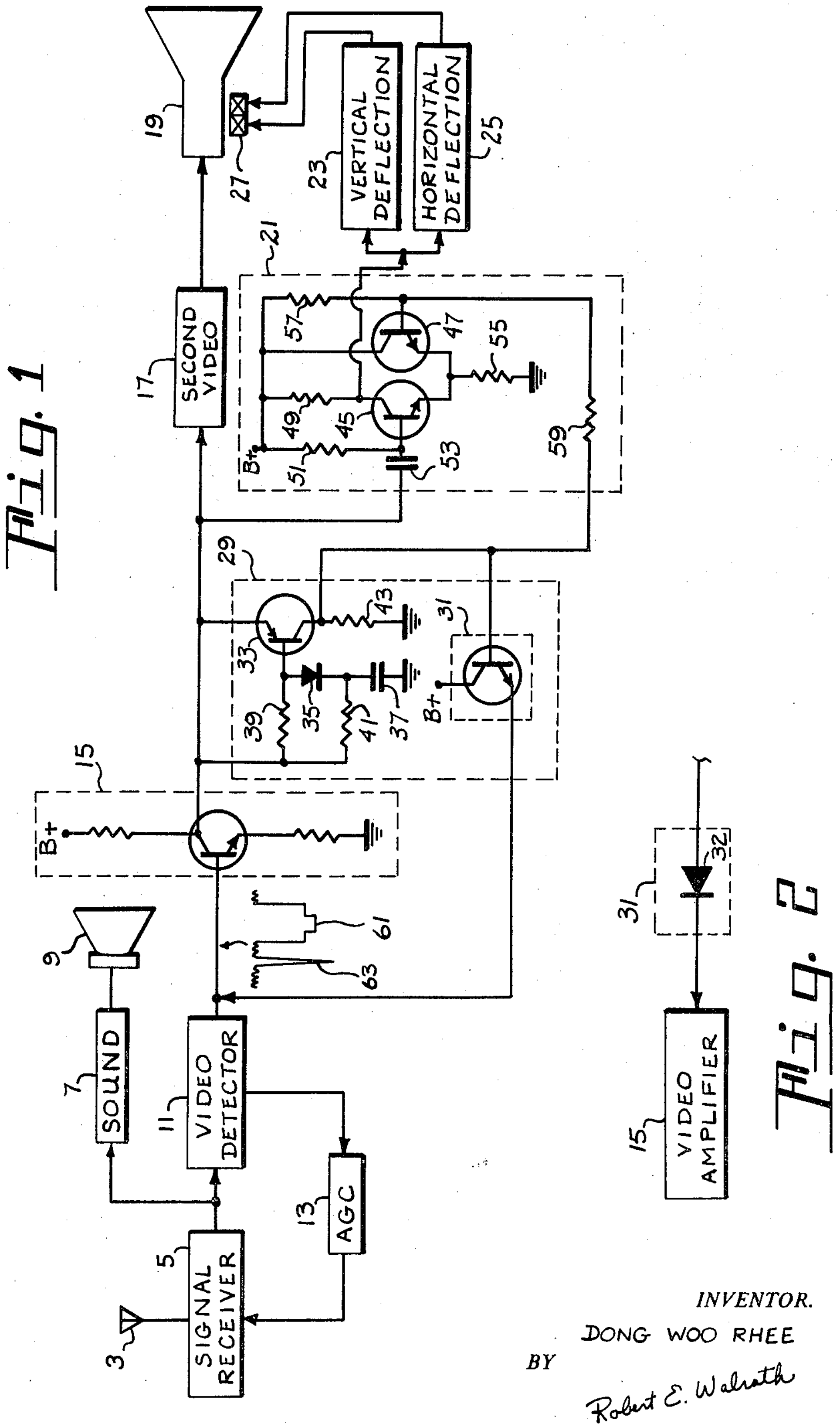
FIG. 1, in block and schematic form, illustrates a television receiver which includes a preferred embodiment of the invention.
FIG. 2 illustrates alternative feedback circuitry applicable to the receiver of FIG. 1.

For a better understanding of the present invention, together with other and further objects, advantages and capabilities thereof, reference is made to the following disclosure and appended claims in conjunction with the accompanying drawing.

Referring to the drawing, a television receiver includes the usual antenna 3 for intercepting transmitted television signals. A signal receiver 5 includes the ordinary RF and IF amplifier, detector, and mixer components and is coupled and responsive to the signals intercepted by the antenna 3.

The signal receiver 5 provides signals representative of sound information which are applied to a sound channel 7 and then to a loudspeaker 9. Also, signals from the signal receiver 5 are applied to a video detector stage 11 wherein signals representative of video information are developed. These signals representative of video signal information available at the video detector stage 11 are applied to an automatic gain control (AGC) stage 13. In turn, potentials available from the AGC stage 13 are applied to and control the operation of the signal receiver 5 such that variations in received signal strength are compensated for and a substantially uniform value of video signal strength is maintained.

A first video amplifier stage 15 is coupled to the video detector or video signal source 11 and provides signals for a second video amplifier 17, which, in turn, is coupled to an image reproducer or cathode ray tube 19. The first video amplifier stage 15 is also coupled to a sync pulse separation stage 21 which provides synchronizing signals at horizontal and vertical scan frequencies. These synchronizing signals are applied to vertical deflection and horizontal deflection stages, 23 and 25, respectively, which are coupled to deflection apparatus 27 associated with the cathode ray tube 19.

Importantly, a self-tracking noise signal suppressing circuit 29 is coupled to the series connected first and second video signal amplifier stages 15 and 17 respectively. Therein, a feedback circuit 31 preferably, not necessarily, includes a feedback amplifier stage whereby amplified noise signals available from the output of the noise signal suppressing circuit 29 are applied to the first video amplifier stage 15 coupled to the video detector stage 11.

The self-tracking noise signal suppressing circuit 29 includes an electron device such as a transistor 33 having a first signal input electrode or emitter, a second signal input electrode or base, and an output electrode or collector. The emitter is directly coupled to the series connected first and second video amplifier stages 15 and 17. A peak detecting and signal averaging circuit includes a series connected unidirectional conduction device or diode 35 and capacitor 37 coupling the base electrode to a potential reference level, a first impedance or resistor 39 coupled to the first and second video amplifier stages 15 and 17, and a second impedance or resistor 41 coupling the junction of the diode 35 and capacitor 37 to the first and second video amplifier stages 15 and 17. The collector is coupled to circuit ground via a resistor 43 and the feedback network 31, an emitter follower stage in this instance, to the series coupled video detector stage 11 and first video amplifier stage 15.

Alternatively, FIG. 2 illustrates an embodiment wherein the feedback network 31 includes a diode 32 rather than a transistor for example. In this instance, the diode 32 merely conducts rather than amplifies in accordance with desired requirements of the designer.

Also, the sync pulse separation stage 21 preferably includes a sync pulse separation transistor 45 and a noise signal switching transistor 47. The sync pulse separation transistor 45 includes a collector electrode coupled by a resistor 49 to a potential source B+, a base electrode coupled via a resistor 51 to the potential source B+ and via a capacitor 53 to the junction of the first and second video amplifiers 15 and 17 respectively, and an emitter electrode coupled by way of a resistor 55 to a potential reference level such as circuit ground. The collector electrode provides output signals which are applied to the vertical and horizontal deflection stages 23 and 25.

The noise signal switching transistor 47 has a collector electrode coupled to the potential source B+ and a base electrode connected by a resistor 57 to the potential source B+ and via a resistor 59 to a junction of the collector electrode of the transistor 33 of the noise signal suppressing circuit 29 and the feedback circuit 31. The emitter electrode of the noise signal switching transistor 47 is coupled to the emitter electrode of the sync pulse separation transistor 45 and the resistor 55 coupled to circuit ground.

In operation, a video signal available from the video detector or video signal source 11 includes sync pulse signals 61 having a given polarity and may include undesired random noise pulse signals 63. These signals 61 and 63 are applied to the first video amplifier stage 15 wherein the usual phase inversion occurs. The phase inverted video signal is applied to the peak detecting network which includes the first impedance 39, the diode 35, and the capacitor 37 whereby the signal charges the capacitor 37 to the level of the sync pulse signal whereupon momentary random noise signals of a magnitude greater than the magnitude of the sync pulse signals are, in effect, by-passed to circuit ground since the capacitor 37 and resistor 39 provide a long time constant. Thus, noise signals of a magnitude greater than the magnitude of the sync pulse signals are "clipped" by the emitter of the electron device 33 whether they occur before, during, or after the time period of the sync pulse signals.

Also, the capacitor 37 and second impedance 41 serve as an averaging network for the video signal appearing at the output of the first video amplifier stage 15. In other words, the second impedance 41 and capacitor 37 provide a potential at the junction of the diode 35 and capacitor 37 which is representative of the average magnitude of the applied video signal. Thus, the peak detecting network continuously tracks the level of the applied video signals and insures detection of the sync pulse tip regardless of variations in magnitude of the applied video signals.

Further, random noise pulse signals available at the output of the first video amplifier stage 15 and of a magnitude greater than the magnitude of the sync pulse signal tips are directly applied to the emitter electrode and amplified by the electron device 33. In turn, the random noise signals are phase inverted by the first video amplifier stage 15 and amplified by the electron device 33, and applied to the feedback network 31. The feedback network 31 couples the feedback signals, having a polarity opposite to the polarity of the signals available from the video signal source 11, to the first video amplifier stage 15. Thus, the random noise signals of a magnitude greater than the magnitude of the sync pulse signal tips in the applied video signal are, in essence, cancelled by the amplified random noise signals available from the feedback network 31.

Additionally, the noise signal switching transistor 47 is firmly DC biased by the series connected resistors 57, 59, and 43 as well as the emitter resistor 55. Thus, a DC reference potential at the emitter of the noise signal switching transistor 47 is established by the resistor divider which include the above-mentioned series connected resistors 57, 59, and 43 and the emitter resistor 55. Moreover, the sync pulse separation transistor 45 is biased by the resistor 51.

When the video signal does not include random noise signals, the sync pulse separator transistor 45 will operate in a normal manner charging the capacitor 53 to a potential substantially equal to the voltage difference of the sync pulse tip level and the above-described DC reference potential. The output of the sync pulse separator transistor 45 will be applied to the vertical and horizontal deflection stages 23 and 25.

However, a random noise signal appearing in the video signal will be "clipped" at the sync tip level by the noise signal suppressing circuit 29. Thus, the charge voltage of the capacitor 53 will not exceed the difference in voltage between the sync pulse tip level and the DC reference potential.

Moreover, a random noise signal will be amplified by the transistor 33 of the noise signal suppressing circuit 29 and applied via the resistor 59 to the base electrode of the noise signal switching transistor 47. This amplified noise signal will, momentarily, increase the DC reference voltage appearing at the junction of the emitter electrode of the signal switching transistor 47 and the resistor 55 which, in turn, turns off or renders non-conductive the sync pulse separation transistor 45. Thus, the random noise signals are virtually eliminated from the sync pulse separation stage 21 output due to the non-conduction of the sync pulse separation transistor 45 when the DC reference voltage increases in a positive direction.

Thus, there has been provided a unique self-tracking random noise signal suppressing circuit. The circuit is independent of automatic gain control (AGC) adjustments and suitable for use with any of the known forms of AGC and sync pulse separation circuitry. Also, the circuitry is not only clamped to the tips of the sync pulse signals but also tracks these sync pulse signal tips even when the magnitude of the applied signal varies. As a result, random noise signals greater than the sync pulse signals are greatly suppressed. Moreover, the circuitry is economical and readily adapted to modular applications for numerous types of video signal apparatus.

While there has been shown and described what is at present considered the preferred embodiment of the invention, it will be obvious to those skilled in the art that various changes and modifications may be made therein without departing from the invention as defined by the appended claims.

I claim:

1. In a video signal apparatus having a first amplifier stage coupled to a video signal source and to a second amplifier stage, a self-tracking noise signal suppressing circuit comprising: an electron device having first and second signal input electrodes and a signal output electrode;

means for coupling said first signal input electrode to said coupled first and second amplifier stages;

circuit means including a series connected unidirectional conduction device and capacitor coupling said second signal input electrode to a potential reference level and an impedance coupling said input electrode to said coupled first and second amplifier stages; and means for coupling said signal output electrode to said coupled video signal source and first amplifier stage whereby said unidirectional conduction device and capacitor tend to clamp said electron device to a given level of applied signal and said output electrode provides an output signal for cancelling noise signals above said given level of said applied signal.

2. The noise signal suppressing circuit of claim 1 wherein said circuit means includes a second impedance coupling the junction of said series connected unidirectional conduction device and capacitor to said first and second amplifier stages.

3. The noise signal suppressing circuit of claim 2 wherein said second impedance is a resistor.

4. The noise signal suppressing circuit of claim 1 wherein said first and second amplifier stages are video signal amplifier stages, said video signal source provides video signals which include noise signals of a given polarity and said output electrode of said noise signal suppressing circuit provides noise signals of a polarity opposite to said given polarity whereby cancellation of said noise signals in said video signals is effected.

5. The noise signal suppressing circuit of claim 1 wherein said means for coupling said signal output electrode to said coupled video signal source and first amplifier stage includes a third impedance coupling said output electrode to a potential reference level and a noise signal amplifier stage coupling said output electrode to said coupled video signal source and first amplifier stage.

6. In a television receiver having video signal apparatus including a video signal source providing video signals which may include undesired noise signals and a first video signal amplifier stage coupling the video signal source to a second video signal amplifier stage, a self-tracking noise signal suppressing circuit comprising:

transistor means having emitter, base, and collector electrodes;

circuit means directly coupling said emitter electrode to said coupled first and second video signal amplifier stages;

peak detecting and signal averaging circuit means coupling said base electrode to a potential reference level and to said coupled first and second video signal amplifier stages, said circuit means including a series connected diode and capacitor coupling said base electrode to said potential reference level, a first impedance coupling said base electrode to said coupled first and second video signal amplifier stages, and a second impedance coupling the junction of said series connected diode and capacitor to said coupled first and second video signal amplifier stages; and feedback circuit means coupling said collector electrode to said coupled video signal source and first video signal amplifier stage.

7. The noise signal suppressing circuit of claim 6 wherein said first and second impedances are in the form of resistors.

8. The noise signal suppressing circuit of claim 6 wherein said video signal source provides video signals having a given polarity and said feedback circuit means effects application of signals having a polarity opposite to said given polarity to said coupled video signal source and first video signal amplifier stage.

9. In video signal apparatus having a series connected video signal source and first and second video amplifier stages, self-tracking noise signal suppressing and sync pulse separation circuitry comprising:

noise signal suppressing circuitry having amplifier means with a first input circuit coupled to said first and second video amplifier stages, a second input circuit coupled via a series connected unidirectional conduction device and capacitor to a potential reference level and by an impedance to said first and second video amplifier stages, and an output circuit coupled via a feedback means to said video signal source and first video amplifier stage; and sync pulse separation means coupled to said first and second video amplifier stages and to said output circuit of said noise signal suppressing circuitry whereby said sync pulse separation means is disabled upon application of an amplified noise signal thereto from said amplifier means of said noise signal suppressing circuitry.

10. The circuitry of claim 9 wherein said sync pulse separation means includes sync pulse separation and noise signal switching electron devices coupled to a common DC reference potential level with said noise signal switching electron device coupled to said amplifier means of said noise signal suppressing circuitry.

11. The circuitry of claim 9 wherein said sync pulse separation means includes a noise signal switching electron device coupled intermediate a potential source and a DC reference potential level and via an impedance to said noise signal suppressing circuitry.

12. The circuitry of claim 9 wherein said sync pulse separation means includes sync pulse separation and noise signal switching electron devices in the form of transistors having output electrodes coupled to a potential source and input electrodes coupled in common to an impedance connected to a potential reference level.

* * * * *